United States Patent
Lin et al.

(10) Patent No.: US 10,595,232 B2
(45) Date of Patent: Mar. 17, 2020

(54) WIRELESS COMMUNICATION DEVICE AND METHOD OF CONTROLLING SAME

(71) Applicant: REALTEK SEMICONDUCTOR CORPORATION, Hsinchu (TW)

(72) Inventors: Yu-Nan Lin, Hsinchu (TW); Wei-Chi Lai, Taoyuan (TW); Shen-Chung Lee, Taoyuan (TW); Chung-Yao Chang, Hsinchu County (TW); Wei-Hsuan Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 135 days.

(21) Appl. No.: 15/616,714

(22) Filed: Jun. 7, 2017

(65) Prior Publication Data

US 2017/0272980 A1    Sep. 21, 2017

Related U.S. Application Data

(63) Continuation-in-part of application No. 14/462,905, filed on Aug. 19, 2014, now Pat. No. 9,713,037.

(30) Foreign Application Priority Data

Jan. 2, 2014    (TW) ............................ 103100114 A

(51) Int. Cl.
*H04W 28/22* (2009.01)
*H04L 12/825* (2013.01)
*H04W 74/08* (2009.01)
*H04L 1/00* (2006.01)
*H04L 12/811* (2013.01)

(52) U.S. Cl.
CPC .............. *H04W 28/22* (2013.01); *H04L 1/00* (2013.01); *H04L 47/25* (2013.01); *H04L 47/38* (2013.01); *H04W 74/085* (2013.01); *H04W 74/0816* (2013.01); *H04W 74/0825* (2013.01); *H04W 74/0858* (2013.01)

(58) Field of Classification Search
None
See application file for complete search history.

(56) References Cited

U.S. PATENT DOCUMENTS

| 8,498,305 | B1 * | 7/2013 | Goel ........................ H04L 47/10 370/412 |
| 2005/0163058 | A1 * | 7/2005 | Nabetani ................. H04L 47/10 370/252 |
| 2010/0027464 | A1 * | 2/2010 | Luo ........................ H04L 1/0003 370/328 |
| 2015/0189537 | A1 | 7/2015 | Chang et al. |

FOREIGN PATENT DOCUMENTS

TW           I517615          1/2014

\* cited by examiner

*Primary Examiner* — Alex Skripnikov
(74) *Attorney, Agent, or Firm* — WPAT, PC

(57) ABSTRACT

This invention discloses a method for controlling a wireless communication device to transmit data packets. The method includes steps of: transmitting data packets; counting retry times of data packets in a predetermined time period and generating a result accordingly; comparing said result with a predetermined value and generating a comparison result accordingly; and reducing transmission time of data packets according to said comparison result.

6 Claims, 14 Drawing Sheets

| Set of transmission rates | Initial transmission rate | First retry transmission rate | Second retry transmission rate | Third retry transmission rate |
|---|---|---|---|---|
| T201 | R210 | R211 | R212 | R213 |
| T202 | R220 | R221 | R222 | R223 |
| T203 | R230 | R231 | R232 | R233 |
| T204 | R240 | R241 | R242 | R243 |

| Transmission rate | R210 | R211 | R212 | R213 |
|---|---|---|---|---|
| Number of data packets | 30 | 140 | 50 | 10 |

Fig. 4

| Transmission rate | R210 | R211 | R212 | R213 |
|---|---|---|---|---|
| Number of data packets | 20 | 30 | 30 | 150 |

| Set of transmission rates | Initial transmission rate | First retry transmission rate | Second retry transmission rate | Third retry transmission rate |
|---|---|---|---|---|
| T701 | 0 | 0 | 1 | 2 |
| T702 | 0 | 0 | 0 | 1 |
| T703 | 0 | 1 | 1 | 2 |
| T704 | 0 | 1 | 2 | 2 |

| T901 | ALL (54M, 48M, 36M, 24M, 18M, 12M, 9M, 6M) |
| --- | --- |
| T902 | 54M, 48M |
| T903 | 54M, 48M, 36M, 24M |
| T904 | 36M, 24M, 18M, 12M, 9M, 6M |

Fig. 9

| Transmission rate | 54M | 54M | 48M | 36M |
| --- | --- | --- | --- | --- |
| Number of data packets | 50 | 120 | 30 | 20 |

Fig. 10

| Set of transmission rates | Initial transmission rate | First retry transmission rate | Second retry transmission rate | Third retry transmission rate |
|---|---|---|---|---|
| T1101 | 0 | 0 | 0 | 2 |
| T1102 | 0 | 0 | 1 | 4 |
| T1103 | 0 | 1 | 4 | 6 |
| T1104 | 0 | 2 | 5 | 8 |
| T1105 | 0 | 4 | 8 | 12 |

Fig. 11

| Transmission rate | MCS31 | MCS31 | MCS30 | MCS27 |
|---|---|---|---|---|
| Number of data packets | 30 | 40 | 90 | 120 |

Fig. 12

| Transmission rate | MCS27 | MCS27 | MCS26 | MCS24 |
|---|---|---|---|---|
| Number of data packets | 30 | 40 | 90 | 120 |

Fig. 13

| Transmission rate | MCS27 | MCS27 | MCS26 | MCS24 |
|---|---|---|---|---|
| Number of data packets | 60 | 120 | 50 | 20 |

Fig. 15

| Transmission rate | MCS27 | MCS27 | MCS26 | MCS24 |
|---|---|---|---|---|
| Number of data packets | 120 | 120 | 25 | 10 |

Fig. 16

| Transmission rate | MCS 9 | MCS 8 | MCS 7 |
|---|---|---|---|
| Number of retries | 1035 | 101 | 0 |

Fig. 18A

| Transmission rate | MCS 9 | MCS 8 | MCS 7 |
|---|---|---|---|
| Number of retries | 985 | 1024 | 768 |

Fig. 18B

WIRELESS COMMUNICATION DEVICE AND METHOD OF CONTROLLING SAME

CROSS REFERENCE

The present application is a continuation-in-part of U.S. patent application Ser. No. 14/462,905, which was filed Aug. 19, 2014, the disclosure of which is hereby incorporated by reference in its entirety.

BACKGROUND OF THE INVENTION

1. Field of the Invention

This invention relates to a wireless communication device and a method of determining transmission rates of a wireless communication device, especially to a wireless communication device and its associated method that adaptively select transmission rate according to the conditions of the communication environment.

2. Description of Related Art

In a wireless communication system, a system is typically provided with a plurality of transmission rates. The selection of transmission rate depends on a variety of conditions. When a receiving end is far away from the transmitting end, the transmission rate must be low so that it is easier for the receiving end to receive data packets. On the other hand, when the receiving end is close to the transmitting end but there is much environmental interference or another wireless device is competing for the access to this channel, a high transmission rate is better because a high transmission rate shortens the transmission time of a data packet so that environmental interference and interference or collision from the wireless signals of other wireless devices are less likely to happen. Therefore, an appropriate transmission rate adjusting method is critical to a wireless transmission system.

In a wireless communication system, an appropriate transmission rate, sufficient transmission power, and good signal quality are essential for a data packet to be correctly transmitted from the transmitting end to the receiving end. If the transmission power and the signal quality do not change, the transmission rate must be properly adjusted to meet the requirement at the receiving end so data packets can be correctly transmitted to the receiving end. Many wireless communication systems have a retry mechanism. In the 802.11 standard, a transmission method that uses carrier-sense multiple-access, collision avoidance (CSMA/CA) with acknowledgement (ACK) is adopted. In this method the transmitting end waits for a period of time to detect whether there are other signals in the air before transmitting a data packet, and transmits the data packet if no transmission of other data packets at that time is confirmed. After the data packet is transmitted, the transmitting end will transmit the data packet again if an ACK packet from the receiving end is not received after a certain period of time, implying a failure transmission of the data packet. Reasons for the receiving end not being able to receive the data packet may be many but are basically classified into two main types. The first type is that a signal-to-noise ratio (SNR) of the data packet received at the receiving end is too low so the receiving end cannot receive the data packet correctly. The second type is that the transmitted data packet encounters either interference or collision with wireless signals from other wireless devices so the receiving end cannot receive the data packet correctly.

If it is the first case, the transmitting end must transmit the data packet at a lower transmission rate. The requirement for SNR at the receiving end can be lower due to a lower transmission rate; therefore, compared to a higher transmission rate, the data packet at a lower transmission rate is more likely to be correctly received. Another solution to the first case is to increase the transmission power, which is equivalent to increasing the SNR at the transmitting end, so the data packet which were not received correctly can then be received correctly. If it is the second case, the transmission rate should not be lowered. If the transmission rate is lowered, collision probability will be increased due to a longer transmission time in the air of the data packet.

SUMMARY OF THE INVENTION

In consideration of the imperfections of the prior art, an object of the present invention is to provide a wireless communication device and a method of determining transmission rates of a wireless communication device, so as to make an improvement to the prior art.

The present invention discloses a method of deciding a target set of transmission rates of a wireless communication device, which transmits data packets according to a plurality of transmission rates of the target set of transmission rates. The method comprises: providing a plurality of candidate sets of transmission rates; transmitting a plurality of data packets according to a primary set of transmission rates; counting retry times of the data packets in a predetermined time period and generating a counting result accordingly; and selecting one of the candidate sets of transmission rates to be the target set of transmission rates according to the counting result.

The present invention also discloses a wireless communication device, which comprises: a storage unit for storing a plurality of candidate sets of transmission rates, each comprising a plurality of transmission rates; a high-frequency transceiver circuit; and a processing unit, coupled to the storage unit and the high-frequency transceiver circuit, for accessing the sets of transmission rates and controlling the high-frequency transceiver circuit to transmit a plurality of data packets. The processing unit comprises a primary transmission rate set determining module for selecting one of the candidate sets of transmission rates to be a primary set of transmission rates, wherein the processing unit controls the high-frequency transceiver circuit to transmit a part of the data packets according to the primary set of transmission rates; a retry packet detection module for counting retry times of the data packets to generate a counting result; and a transmission rate set determining module for selecting one of the candidate sets of transmission rates to be a target set of transmission rates according to the counting result, wherein the processing unit controls the high-frequency transceiver circuit to transmit the remaining data packets according to the target set of transmission rates.

The present invention also discloses a method for controlling a wireless communication device to transmit data packets. The method includes steps of: transmitting data packets; counting retry times of data packets in a predetermined time period and generating a result accordingly; comparing said result with a predetermined value and generating a comparison result accordingly; and reducing transmission time of data packets according to said comparison result.

The present invention also discloses a method for controlling a wireless communication device to reduce the number of retry times of data packets during transmission. The method includes steps of: using a first packet length to generate and transmit data packets; counting retry times of data packets in a predetermined time period and generating a result accordingly; and using a second packet length smaller than said first packet length to generate and transmit data packets when said result is greater than a predetermined value.

The wireless communication device and the method of determining the transmission rates of the wireless communication device of the present invention are able to detect the current conditions of the communication environment and thus select a proper transmission rate and/or packet length to transmit data packets. In comparison with the prior art, the wireless communication device and the method of determining the transmission rate of the wireless communication device of the present invention decides the proper transmission rate and/or packet length according to the complexities of the communication environment, such as the collision degree, number of retries, or retry rate of data packets, and the transmission rate and the signal strength of another communication device, so the communication quality of the wireless transmission can be further enhanced.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 4 illustrates a counting result of data packet transmission times according to one embodiment of the present invention.

FIG. 5 illustrates an example of the counting result of the data packets transmission times according to the present invention.

FIG. 7 illustrates sets of transmission rates according to another embodiment of the present invention.

FIG. 9 illustrates an example of the initial sets of transmission rates according to an embodiment of the present invention.

FIG. 10 illustrates an example of the counting result of the data packets transmission times according to the present invention.

FIG. 11 illustrates a plurality of sets of transmission rates according to another embodiment of the present invention.

FIG. 12 illustrates an example of the counting result of the data packets transmission times according to the present invention.

FIG. 13 illustrates an example of the counting result of the data packets transmission times according to the present invention.

FIG. 15 illustrates an example of the counting result of the data packets transmission times according to the present invention.

FIG. 16 illustrates an example of the weighted counting result according to the present invention.

FIGS. 18A-18B show the distribution of number of retries with respect to transmission rates.

DETAILED DESCRIPTION OF THE PREFERRED EMBODIMENTS

The following description is written by referring to terms of this invention field. If any term is defined in the specification, such term should be explained accordingly. Besides, the connection between objects or events in the following embodiments can be direct or indirect provided that these embodiments are still applicable under such connection. Said "indirect" means that an intermediate object or a physical space exists between the objects, or an intermediate event or a time interval exists between the events. The present invention discloses a wireless communication device and a method of determining transmission rates of a wireless communication device, and the detail known in this field will be omitted if such detail has little to do with the features of the present invention. People of ordinary skill in the art can choose components or steps equivalent to those described in this specification to carry out the present invention, which means that the scope of this invention is not limited to the embodiments in the specification. On account of that some or all elements of said device invention could be known, the detail of such elements will be omitted provided that this omission nowhere dissatisfies the specification and enablement requirements. Besides, said method invention can be in the form of firmware and/or software which could be carried out by the device of this invention or the equivalent thereof; hence, the following description on the method invention will focus on the processes and steps instead of the hardware without dissatisfying the specification and enablement requirements.

Figures 1, 2:
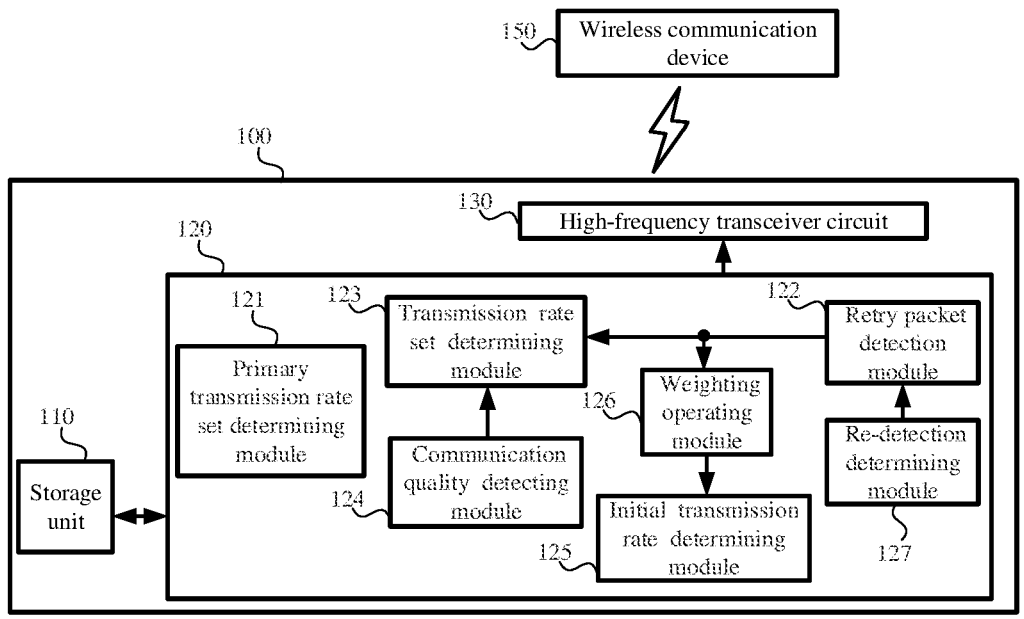
FIG. 1 illustrates the block diagram of a wireless communication device according to an embodiment of the present invention.
FIG. 2 illustrates plural sets of transmission rates according to an embodiment of the present invention.

Please refer to FIG. 1, illustrating the block diagram of a wireless communication device according to an embodiment of the present invention. The wireless communication device 100 comprises a storage unit 110, a processing unit 120, and a high-frequency transceiver circuit 130. The storage unit 110 stores a plurality of candidate sets of transmission rates. The processing unit 120 selects a target set of transmission rates from the candidate sets of transmission rates, and then controls the high-frequency transceiver circuit 130 to transmit data packets to another wireless communication device 150 according to the plurality of transmission rates comprised in the target set of transmission rates. The processing unit 120 may be a micro control unit (MCU) or a central processing unit (CPU). In a preferred embodiment, if the wireless communication device 100 is a portable mobile device, such as a cell phone, a tablet, or a laptop, the processing unit 120 is the processing unit of the portable mobile device. The processing unit 120 comprises a primary transmission rate set determining module 121, a retry packet detection module 122, a transmission rate set determining module 123, a communication quality detecting module 124, an initial transmission rate determining module 125, a weighting operating module 126, and a re-detection determining module 127. Please refer to FIG. 2, illustrating plural sets of transmission rates according to an embodiment of the present invention. The table 200 comprises 4 sets of transmission rates T201~T204, each comprising an initial transmission rate and a plurality of retry transmission rates. When the wireless communication device 100 initially transmits a data packet, the processing unit 120 controls the high-frequency transceiver circuit 130 to transmit at the initial transmission rate. If the initial transmission fails, the processing unit 120 further controls the high-frequency transceiver circuit 130 to transmit the same data packet again at the first retry transmission rate, and so forth. For example, if the processing unit 120 selects the set of transmission rates T201 as the current set of transmission rates, the wireless communication device 100 will use the transmission rate R210 to transmit a data packet for the first time. If the first transmission fails, the wireless communication device 100 transmits the same data packet again at transmission rates R211, R212 and R213 until the receiving end replies an acknowledgement of successful transmission. The table 200 records the absolute transmission rate; for example, R210 strands for 54 MHz and R211 stands for 48 MHz. The retry times in the table 200 are merely illustrated as examples, and may be more in practical implementations.

Figure 3:
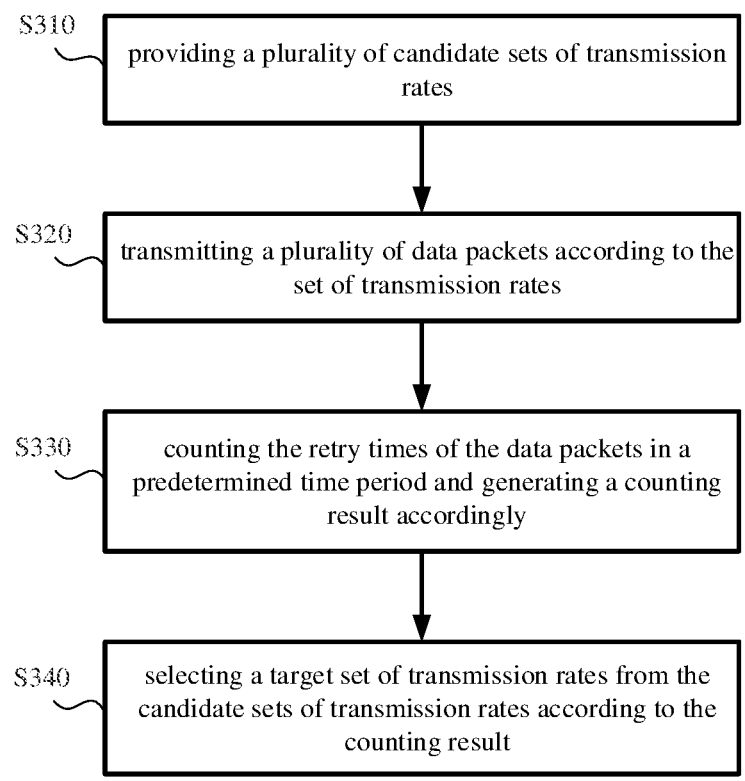
FIG. 3 illustrates a flow chart of determining the set of transmission rates of a wireless communication device according to an embodiment of the present invention.

Please refer to FIG. 3, illustrating a flow chart of determining the set of transmission rates of a wireless communication device according to an embodiment of the present invention. Please also refer to FIG. 1 to understand this embodiment better. Firstly, a plurality of candidate sets of transmission rates are provided (step S310). The candidate sets of transmission rates can be the sets of transmission rates illustrated in FIG. 2 and are stored in the storage unit 110. Then the primary transmission rate set determining module 121 selects one set of transmission rates from the plurality of sets of transmission rates in table 200 to be a primary set of transmission rates. For example, if the set of transmission rates T201 is selected, the high-frequency transceiver circuit 130 then transmits a plurality of data packets according to the set of transmission rates T201 (step S320). The primary set of transmission rates selected by the primary transmission rate set determining module 121 must have at least one retry transmission rate that is the same as the initial transmission rate. During the transmission, some data packets may be successfully transmitted at their first transmissions and some may not be successfully transmitted until one or more retires are conducted. The retry packet detection module 122 counts the retry times of the data packets in a predetermined time period via the high-frequency transceiver circuit 130 and generates a counting result accordingly (step S330). Please refer to FIG. 4, illustrating a counting result of data packet transmission times according to one embodiment of the present invention. As shown in FIG. 4, 30 data packets can be successfully transmitted at the initial transmission rate, and the numbers of data packets that requires one retry, two retries and three retires are 140, 50 and 10 respectively. Assuming that the four transmission rates R210~R213 of the set of transmission rates T201 respectively represent a high transmission rate, a high transmission rate, a medium transmission rate, and a low transmission rate, the counting result of FIG. 4 indicates that the low success rate of the first time transmission is probably due to collisions in that circumstance. Most data packets, however, can be successfully transmitted at a first retry, but there are still data packets encounter collisions where a second or even a third retry is required for a successful transmission.

Next, the transmission rate set determining module 123 selects a target set of transmission rates from the candidate sets of transmission rates listed in table 200 according to the counting result, and the target set of transmission rates will be employed by the high-frequency transceiver circuit 130 for transmitting the remaining data packets (step S340). In this step, the transmission rate set determining module 123 decides the target set of transmission rates based on whether the number of data packets transmitted at a high transmission rate exceeds a threshold value, such as 70% of total data packet. A higher collision probability is implied when the number of data packets transmitted at a high transmission rate exceeds the threshold value. Taking the counting result of FIG. 4 for example, the number of data packets transmitted at high transmission rates is 170, which exceeds the threshold value (230×0.7=161), so the transmission rate set determining module 123 selects a set of high transmission rates; otherwise, a set of low transmission rates will be selected. An average of all transmission rates of the set of high transmission rates is higher than an average of all transmission rates of the set of low transmission rates. Taking table 200 for example. If the sets of transmission rates T201 and T202 are sets of high transmission rates and the sets of transmission rates T203 and T204 are sets of low transmission rates, an average of all transmission rates of the set of transmission rates T201 or T202 is higher than an average of all transmission rates of the set of transmission rates T203 or T204. When the transmission rate set determining module 123 decides a set of high transmission rates, the set of transmission rates T201 or the set of transmission rates T202 will be selected; on the contrary, when the transmission rate set determining module 123 decides a set of low transmission rates, the set of transmission rates T203 or the set of transmission rates T204 will be selected. In this step, after the target set of transmission rates is decided, the processing unit 120 controls the high-frequency transceiver circuit 130 to continue transmitting the remaining data packets according to the target set of transmission rates. To be more specific, when initially connected with the wireless communication device 150, the wireless communication device 100 temporarily transmits a part of the total data packets according to a primary set of transmission rates, and then decides, based on the retry times of the transmitted data packets, a target set of transmission rates that will then be employed to transmit the remaining data packets.

If the counting result of the step S330 is shown as FIG. 5, where the number of data packets transmitted at high transmission rate is 50 (<161), suggesting a communication environment of insufficient SNR, which may probably be caused by a far distance between the wireless communication device 100 and the wireless communication device 150. As a result, in step S340 the transmission rate set determining module 123 will select a set of low transmission rates such as the set of transmission rates T203 for a communication environment of long distance transmission. The transmission rates R230~R233 may respectively represent a high transmission rate, a medium transmission rate, a low transmission rate, and a low transmission rate. Data packets are more easily transmitted to a distant device by adopting a set of transmission rates whose transmission rates decrease fast as the retry times increase.

Figure 6:
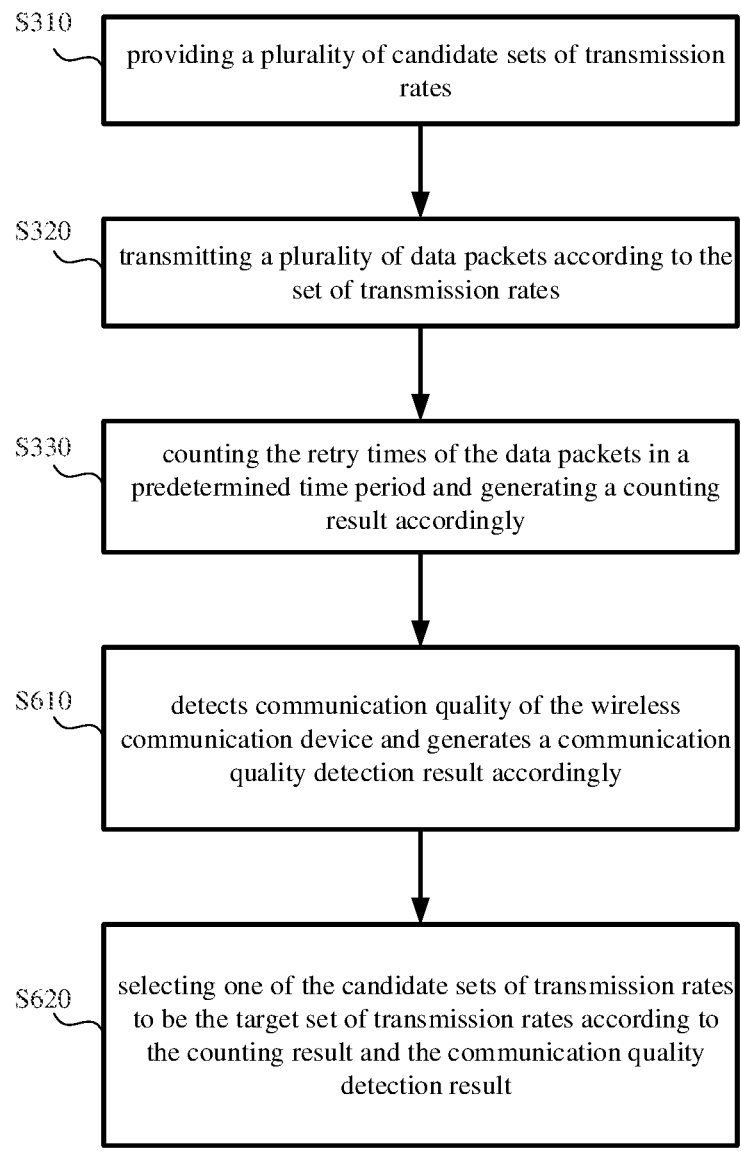
FIG. 6 illustrates a flow chart of deciding a set of transmission rates of a wireless communication device according to another embodiment of the present invention.

Please refer to FIG. 6, illustrating a flow chart of deciding a set of transmission rates of a wireless communication device according to another embodiment of the present invention. In addition to the steps of FIG. 3, this embodiment further includes the following steps.

Step S610: the communication quality detecting module 124 detects communication quality of the wireless communication device 100 and generates a communication quality detection result accordingly. The wireless communication device 100 is able to detect a distance to another wireless communication device 150 and the channel interference degree at that time. The detection can be implemented in several ways, such as using the high-frequency transceiver circuit 130 to measure the signal strength or the transmission rate of the wireless communication device 150. In addition, the initial transmission rate is another reference. A high initial transmission rate stands for a short distance to the wireless communication device 150 and a low initial transmission rate stands for a long distance to the wireless communication device 150. Other parameters such as the number of false alarms, a scanning result of the power spectrum density (PSD), the number of clear channel assessments (CCA), etc. can also be used as references for channel conditions.

Step S620: selecting one of the candidate sets of transmission rates to be the target set of transmission rates according to the counting result and the communication quality detection result. Following the above example, the counting results determines whether the set of high transmission rates (T201 or T202) or the set of low transmission rates (T203 or T204) should be selected, the communication quality detection result further determines a more specific transmission rate suitable for the current communication environment among the sets of high transmission rates or the sets of low transmission rates.

For example, if the counting result shows that the number of data packets transmitted at high transmission rate exceeds the threshold value, which implies collisions are many, and the communication quality detection result shows that the signal strength is larger than another threshold value, e.g., 60%, a communication environment of short distance and many collisions is determined in this situation. Therefore the target set of transmission rates should be selected from the candidate sets of transmission rates, T201 and T202, whichever has retry transmission rates that decrease slower as the retry times increase. For example the initial and retry transmission rates are respectively a high transmission rate, a high transmission rate, a high transmission rate, and a medium transmission rate, i.e., a high transmission rate is still used at the second retry, so that the data packets can be transmitted more efficiently. If, on the other hand, the counting result shows that the number of data packets transmitted at high transmission rate exceeds the threshold value, but the communication quality detection result indicates that the signal strength is only 40%, which is smaller than the threshold value, a communication environment of long distance is determined in this situation. Therefore the target set of transmission rates should be selected from the candidate sets of transmission rates, T201 and T202, whichever has retry transmission rates that decrease faster as the retry times increase. For example, the initial and retry transmission rates are respectively a high transmission rate, a medium transmission rate, a medium transmission rate, and a low transmission rate, i.e., the data packets will have a greater change to be successfully transmitted to the wireless communication device 150 at a lower transmission rate to overcome the long distance.

In a preferred embodiment, the table 200 can be presented in a manner of relative transmission rates. Please refer to FIG. 7, illustrating sets of transmission rates according to another embodiment of the present invention. The initial transmission rate of each set of transmission rates is represented by 0, and the numbers corresponding to the retry transmission rates stand for rank differences with respect to the initial transmission rate. For example, if the initial transmission rate of the set of transmission rates T701 is a high transmission rate, the transmission rates of the first, second, and third retry are respectively a high transmission rate, a medium transmission rate and a low transmission rate. In short, the table 700 is the same as the table 200 in meaning but the recordation of relative transmission rates instead of absolute transmission rates saves storage space. Once the initial transmission rate is determined, all other transmission rates in the same set of transmission rates can then be determined.

Figure 8:
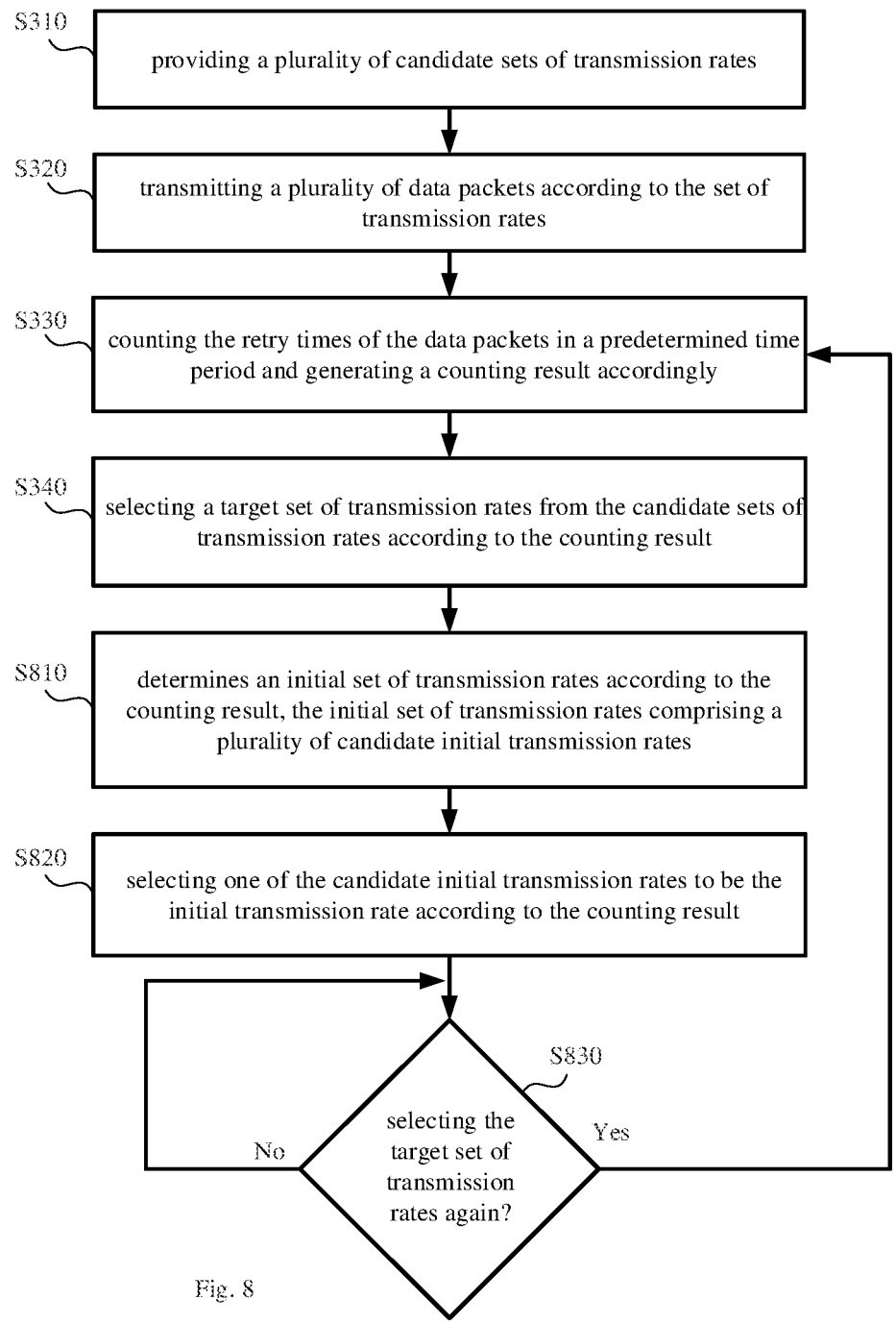
FIG. 8 illustrates a flow chart of deciding a set of transmission rates of a wireless communication device according to another embodiment of the present invention.

The initial transmission rate of any set of transmission rates can be determined in advance or be dynamically determined by the initial transmission rate determining module 125 according to the communication environment at that time. Please refer to FIG. 8, illustrating a flow chart of deciding a set of transmission rates of a wireless communication device according to another embodiment of the present invention. In addition to the steps of FIG. 3, this embodiment further includes the following steps.

Step S810: The initial transmission rate determining module 125 determines an initial set of transmission rates according to the counting result. The initial set of transmission rates comprises a plurality of candidate initial transmission rates. Taking the wireless transmission standard of IEEE 802.11g for example, it defines 8 transmission rates which are, from low to high, 6 MHz, 9 MHz, 12 MHz, 18 MHz, 24 MHz, 36 MHz, 48 MHz, and 54 MHz. The table shown in FIG. 9 comprises initial sets of transmission rates T901~T904, each comprising a plurality of candidate initial transmission rates. For example, the initial set of transmission rates T901 comprises all candidate initial transmission rates, and the initial set of transmission rates T902 comprises two candidate initial transmission rates, 54 MHz and 48 MHz. In a preferred embodiment, when the counting result indicates that the number of data packets transmitted at high transmission rate exceeds the threshold value, the initial transmission rate determining module 125 selects an initial set of transmission rates having high transmission rates, such as the initial sets of transmission rates T901, T902, and T903; and Step S820: selecting one of the candidate initial transmission rates to be the initial transmission rate according to the counting result.

To be more specific, assuming that the step S320 uses a predetermined initial transmission rate of 54 MHz, and uses the set of transmission rates T701 as the primary set of transmission rates, the wireless communication device 100 will transmit data packets at an initial transmission rate of 54 MHz, and when the retry process are required, it uses transmission rates 54 Hz, 48 MHz, and 36 MHz in order, according to the retry transmission rates, to transmit the data packets again. After a period of time, in the step S303, a counting result will be obtained. Taking the counting result of FIG. 10 for example, because the number of data packets transmitted at 54 MHz is 170, which is more than 70% of all data packets, and it is assumed that the transmission rate of the wireless communication device 150 detected by the wireless communication device 100 exceeds a threshold value, e.g., 48 MHz, the communication environment at that time is of short distance and many collisions. Thus in step S340 the transmission rate set determining module 123 can select the set of transmission rates T702 as a basis, according to which the subsequent transmission rates will be decided. In step S810, the initial transmission rate determining module 125 will select the initial set of transmission rates T902 from the table 900 according to the communication environment of short distance and many collisions at that time. In step S820, the initial transmission rate determining module 125 will select one of the available initial transmission rates to be the initial transmission rate. Because the transmission rates comprised in the initial set of transmission rates T902 are high transmission rates, either 54 MHz or 48 MHz is selected as the initial transmission rate, the transmission efficiency will be improved. On the contrary, if the transmission rate of the wireless communication device 150 detected by the wireless communication device 100 is lower than the above-mentioned threshold value, it is implied that the wireless communication device 100 is distant from the wireless communication device 150. As a result, in step S810, the initial transmission rate determining module 125 may select the initial set of transmission rates T904 from the table 900 according to the communication environment of long distance and many collisions at that time. In summary, deciding the initial transmission rate again according to the counting result and/or the communication quality detection result makes the wireless communication device 100 transmit data packets depending more closely on the communication environment at that time, improving the overall transmission efficiency.

For a communication system, the communication environment may change frequently. For example, a user may move his/her laptop so frequently that a distance from the laptop to a wireless base station varies and therefore the set of transmission rates and the initial transmission rate must be decided again. As a result, the flow chart of FIG. 8 further comprises step S830. In step S830, the re-detection determining module 127 determines whether steps S330~S340 and steps S810~S820 should be processed again or not according to certain conditions. In a preferred embodiment, the conditions may comprise: (1) deciding the set of transmission rates again every a predetermined time, e.g., every 10 or 20 seconds; (2) a significant change in the signal strength of the wireless communication device 150; and (3) a significant change in the transmission rate of the wireless communication device 150. There may be some other conditions, such as a change in the number of false alarms, a presence or absence of abnormal signal in a PSD scan result, a change in the number of CCA, a change in the distribution of retry data packets, etc. When deciding to detect the current communication environment again, the re-detection determining module 127 sends control signals to the retry packet detection module 122 to make it refresh the counting result.

The wireless transmission standard of IEEE 802.11n defines 32 transmission rates which are denoted by MCS0~MCS31. The transmission rates are no many that when the wireless communication device 100 adopts the wireless transmission standard of IEEE 802.11n, the table of retry transmission rates will not be as simple as the table 700. Please refer to FIG. 11, illustrating a plurality of sets of transmission rates according to another embodiment of the present invention. Assuming that the initial transmission rate determining module 125 decides the initial transmission rate to be MCS31 and the primary transmission rate set determining module 121 selects the set of transmission rates T1102, the first transmission will be conducted at the transmission rate of MCS31, and the first, second and third retries will respectively be conducted at MCS31, MCS30 and MCS27. It is also assumed that the counting result obtained in step S330 is shown as FIG. 12. Because the number of data packets transmitted at MCS31 is 70, which is less than the threshold value, e.g., 70% of total data packets, and the initial transmission rate in use (MCS31) is higher than the threshold value, e.g., MCS28, the communication environment will be determined to be an environment of low SNR. Since the initial transmission rate is very high, the wireless communication device 100 will select the set of transmission rates T1105 to be the new set of transmission rates. Because the set of transmission rates T1105 will decrease the retry transmission rates more rapidly during the retry process, it will be easier for the wireless communication device 150 to receive the data packets. On the contrary, if the wireless communication device 100 initial selects MCS27 as the initial transmission rate, and the counting result at that time is shown in FIG. 13, whose distribution of retry data packets is the same as that of FIG. 12 but transmission rates are different, the wireless communication device 100 will select the set of transmission rates T1103 or T1104 for the retry process of data packets. The retry transmission rates decrease slower in the set of transmission rates T1103 or T1104, which prevents the transmission rates from dropping too low.

Figure 14:
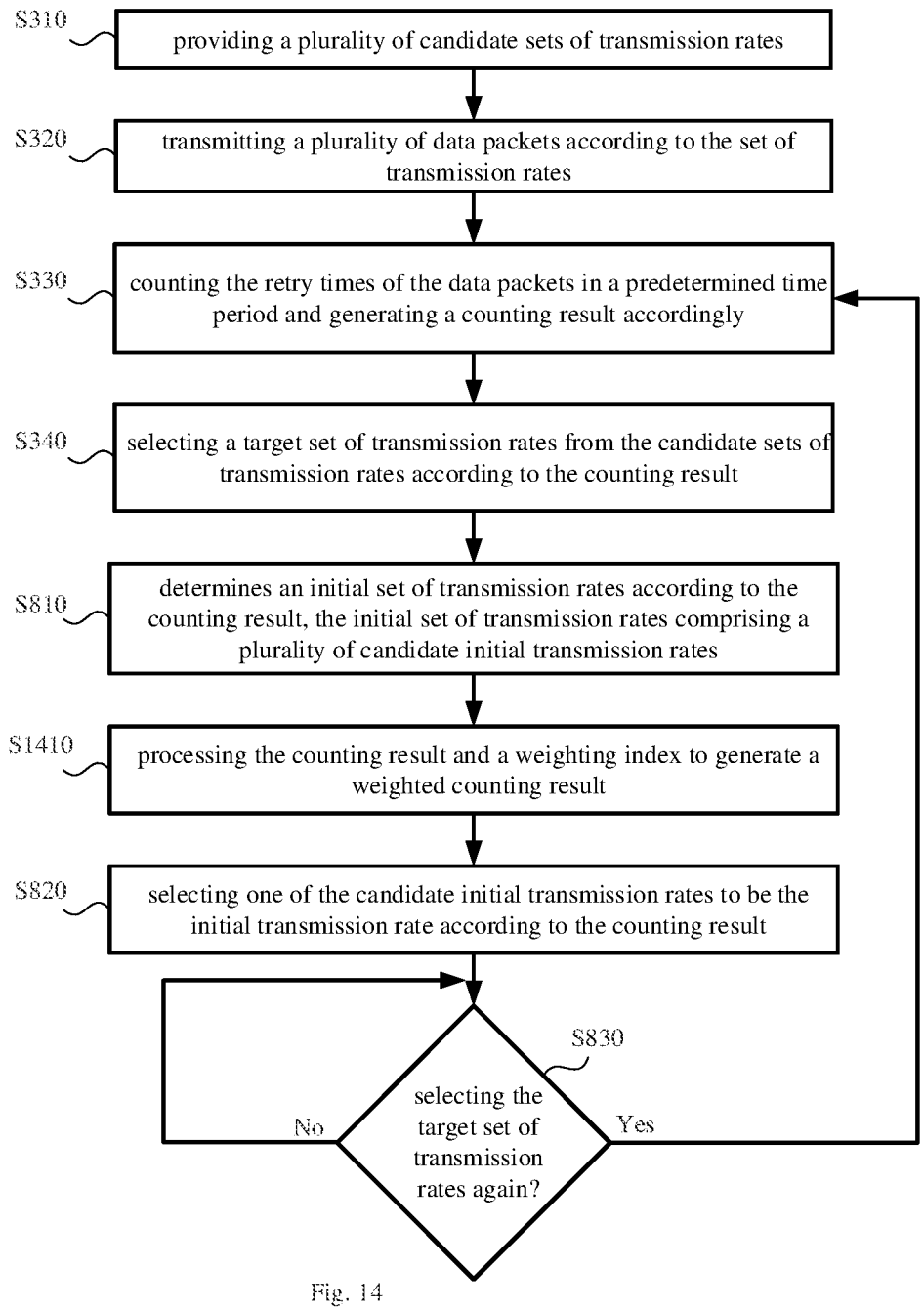
FIG. 14 illustrates a flow chart of deciding a set of transmission rates of a wireless communication device according to another embodiment of the present invention.

Please refer to FIG. 14, illustrating a flow chart of deciding a set of transmission rates of a wireless communication device according to another embodiment of the present invention. Compared with the embodiment illustrated in FIG. 8, an additional step S1410 is introduced between step S810 and step S820 in the flow chart of this embodiment. In step S1410, the weighting operating module 126 processing the counting result and a weighting index to generate a weighted counting result. If, however, the communication quality detection result is obtained as well as the counting results, the weighted counting result is generated according to both the communication quality detection result and the counting result. Assuming that the original counting result is shown in FIG. 15, the communication environment is determined to have many collisions because the number of data packets transmitted at high transmission rate exceeds the threshold value. Since most data packets experience one retry, the weighting operating module 126 gives weightings to the counting result shown in FIG. 15 to prevent the initial transmission rate determining module 125 from selecting a transmission rate lower than the current initial transmission rate MCS27 to be a new initial transmission rate when deciding the initial transmission rate in step S820. For example, 4 different weightings, e.g., 2, 1, 0.5, 0.5, are given to the four transmission rates to generate the new counting result shown in FIG. 16. As a result, in step S820 the initial transmission rate determining module 125 will have a greater chance to select a transmission rate higher than MCS27 to be the initial transmission rate. In a preferred embodiment, when the number of data packets transmitted in high transmission rate exceeds the threshold value, i.e., many collisions occur, step S1410 uses weightings to adjust the counting result.

Figure 17:
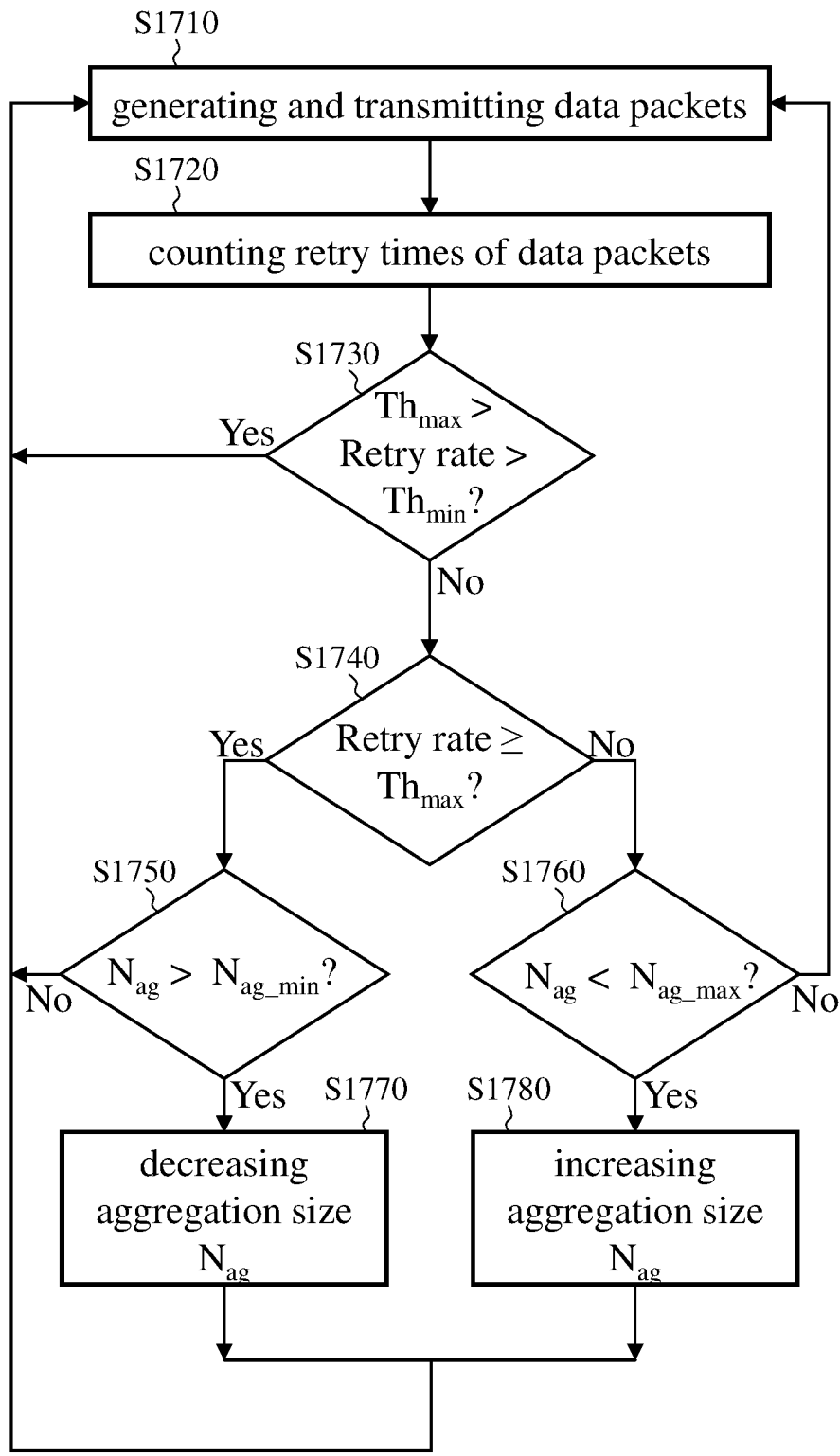
FIG. 17 illustrates a flow chart of controlling a wireless communication device to reduce the collision probability of data packets according to another embodiment of the invention.

According to above descriptions, the collision probability of a data packet is smaller when the transmission time of the data packet becomes shorter. In addition to adjusting the transmission rate, the transmission time of a data packet can also be manipulated by adjusting the packet length of the data packet. FIG. 17 shows a flow chart of controlling a wireless communication device to reduce the collision probability (i.e., reducing the number of retries or retry times) of data packets according to another embodiment of this invention. The wireless communication device is first controlled to generate and transmit multiple data packets (step S1710). The data packets are formed according to an aggregation size $N_{ag}$ and are then transmitted according to the candidate sets of transmission rates as provided in step S310. The retry packet detection module 122 is then controlled to count the retry times of the data packets in a predetermined time period via the high-frequency transceiver circuit 130 and generates a counting result accordingly (step S1720). Step S1720 is similar to step S330, and the details of step S1720 are omitted herein for brevity. Preferably, after the retry times are counted, a retry rate can be further calculated for determining packet lengths of data packets.

It should be noted that when the retry rate is being calculated, the distribution of retries with respect to transmission rates is preferably considered. FIGS. 18A and 18B show two types of number of retries with respect to transmission rates. The number of retries stands for the number of data packets that are transmitted again at a given transmission rate. Specifically, in FIG. 18B, there are 985, 1024, and 768 data packets that are successfully but not first transmitted at MCS 9, MCS 8, and MCS 7, respectively. In FIG. 18A, the number of reties has a tendency to decrease as the transmission rate decreases; in FIG. 18B, on the other hand, the distribution of reties is relatively uniform as opposed to FIG. 18A. The distribution of retries in FIG. 18A may probably result from insufficient sensitivity, while the distribution of retries in FIG. 18B can be used to calculate the retry rate in step S1730. Assuming that the total numbers of data packets transmitted at transmission rates MCS 9, MCS 8, and MCS 7 are M1, M2, and M3, respectively, the retry rates for MCS 9, MCS 8, and MCS 7 are 985/M1, 1024/M2, and 768/M3 respectively, and the overall retry rate is (985+1024+768)/(M1+M2+M3).

Next, in step S1730, the retry rate is compared with two threshold values $Th_{max}$ and $Th_{min}$, where $Th_{max}$ is greater than $Th_{min}$. When the retry rate is within a predetermined range (i.e., $Th_{max}$>retry rate>$Th_{min}$ with step S1730 being positive), the packet lengths of data packets are not adjusted and the process goes back to step S1710 to continue generating and transmitting more data packets. When the retry rate is not smaller than the upper limit $Th_{max}$ of the predetermined range (i.e., retry rate ≥$Th_{max}$ with step S1730 being negative and step S1740 being positive), it is determined whether the current aggregation size $N_{ag}$ is greater than a threshold value $N_{ag\_min}$ (step S1750). When step S1750 is positive, the aggregation size $N_{ag}$ is decreased (step S1770). As a result, the packet lengths of data packets become shorter, which ensures a lower collision probability the data packets may encounter during transmission because the transmission time of the data packets is shortened for the same transmission rate. After the aggregation size $N_{ag}$ is decreased, the process goes back to step S1710 to generate data packets with updated aggregation size $N_{ag}$ and transmit the data packets generated.

In step S1750, when the current aggregation size $N_{ag}$ is not greater than the threshold value $N_{ag\_min}$ (step S1750 being negative), meaning that the current aggregation size $N_{ag}$ may have reached the threshold value $N_{ag\_min}$ and therefore the packet length cannot be further decreased, the process then goes back to S1710 to continue generating and transmitting data packets with minimum aggregation size $N_{ag\_min}$.

When the retry rate is not greater than the lower limit $Th_{min}$ of the predetermined range (i.e., retry rate ≤$Th_{min}$ with both steps S1730 and S1740 being negative), it is determined whether the current aggregation size $N_{ag}$ is smaller than a threshold value $N_{ag\_max}$ (step S1760), where $N_{ag\_max}$ is greater than $N_{ag\_min}$. When step S1760 is positive, the aggregation size $N_{ag}$ is increased (step S1780). As a result, the packet lengths of data packets become longer and therefore the wireless communication device can operate in a more effective way to enhance the throughput of data transmission. After the aggregation size $N_{ag}$ is increased, the process goes back to step S1710.

In step S1760, when the current aggregation size $N_{ag}$ is not smaller than the threshold value $N_{ag\_max}$ (step S1760 being negative), meaning that the current aggregation size $N_{ag}$ may have reached the threshold value $N_{ag\_max}$ and therefore the packet length cannot be further increased, the process then goes back to S1710 to continue generating and transmitting data packets with maximum aggregation size $N_{ag\_max}$. In steps S1770 and S1780, the aggregation size may be decrease or increased by a predetermined value (e.g., 1) each time, or by any value that is dynamically-determined based on the current retry rate.

The aggregation size mentioned above is referred to as the number of subframes included in a data packet. Taking IEEE 802.11n for example, an aggregation size of L (a positive integer) means that L MAC service data unit (MSDU) subframes are included in one aggregate MSDU (A-MSDU), or L MAC protocol data unit (MPDU) subframes are included in one aggregate MPDU (A-MPDU). The aggregation size may also be applied to other standards, where a number of subframes can be aggregated into one data packet to form a greater packet length.

Figure 19:
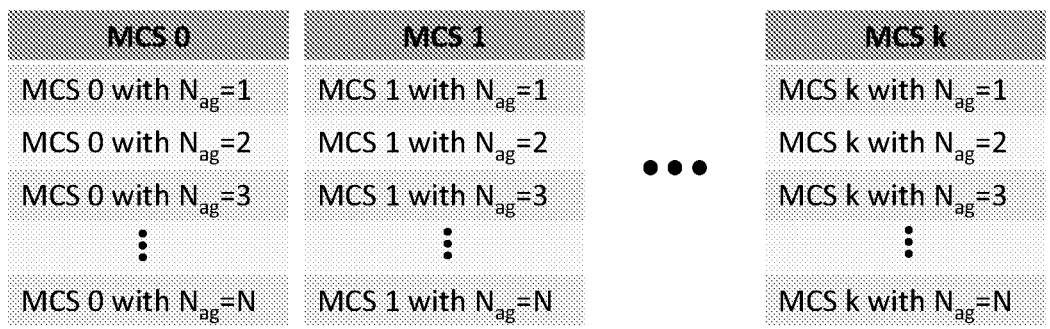
FIG. 19 shows multiple modulation and coding schemes (MCS), each including a plurality of aggregation sizes.

According to another embodiment of this invention, another approach to reducing the collision probability of data packets is also provided. By incorporating the aggregation size into transmission rates, this embodiment not only determines an appropriate transmission rate based on the retry times or retry rate, but also determines the aggregation size to further control the transmission time of a data packet. As shown in FIG. 19, each modulation and coding scheme (MCS) defined by the wireless transmission standard of IEEE 802.11n is accompanied by multiple aggregation sizes. With the table shown in FIG. 19, in the process of selecting transmission rates as illustrated in FIGS. 3, 6, 8, and 14, a transmission rate with a specified aggregation size will be selected. In this way, this invention enables fine tune to the transmission time of a data packet. For example, MCS 1 with aggregation size $N_{ag}$=3 may correspond to a retry rate R1, and MCS 1 with aggregation size $N_{ag}$=2 may correspond to another retry rate R2 greater than R1. Although the transmission rate remains unchanged, the aggregation size $N_{ag}$ is adjusted according to the retry rate to further reduce the transmission time by decreasing the packet length. In another example, when an aggregation size $N_{ag}$=N is being used but the retry rate is still greater than a threshold value (e.g., the upper limit $Th_{max}$), another MCS group with a higher transmission rate is then selected to transmit data packets, and a smaller aggregation size $N_{ag}$<N may be selected accordingly as long as the transmission time is reduced due to the higher transmission rate. The number N in FIG. 19 is an integer.

To sum up, when the retry rate is small, the throughput of the wireless transmission device can be improved by increasing the aggregation size; when the retry rate is large, the collision probability can be reduced by decreasing the aggregation size. When the collision probability is lowered, the reliability of the wireless communication system is thus enhanced due to reduced retry times; as a result, the overall throughput is also improved.

Since people of ordinary skill in the art can appreciate the implementation detail and the modification thereto of the present method invention of FIGS. 3, 6, 8, 14 and 17 through the disclosure of the device invention of FIG. 1, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are just exemplary for understanding, not for limiting the scope of this invention. Besides, each aforementioned embodiment may include one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method for controlling data packets transmission by a wireless communication device, comprising:
   transmitting data packets;
   counting transmission retry times in a predetermined time period and generating a result accordingly;
   comparing said result with a predetermined value and generating a comparison result accordingly;
   reducing transmission time by increasing a transmission rate according to said comparison result, wherein said transmission rate is provided with a plurality of aggregation sizes, said plurality of aggregation sizes includes a first aggregation size and a second aggregation size, and said first aggregation size is currently in use; and
   selecting said second aggregation size without further increasing said transmission rate when said result is greater than said predetermined value, wherein said second aggregation size is smaller than said first aggregation size;
   wherein said wireless communication device generates data packets according to one of said plurality of aggregation sizes.

2. The method of claim 1, wherein each of said plurality of aggregation sizes is the number of MAC service data unit (MSDU) subframes included in an aggregate MSDU (A-MSDU), or the number of MAC protocol data unit (MPDU) subframes included in an aggregate MPDU (A-MPDU).

3. The method of claim 1, wherein said step of reducing transmission time comprises:
   decreasing data packet lengths.

4. The method of claim 1, wherein each of said plurality of aggregation sizes is associated with the number of MAC service data unit (MSDU) subframes included in an aggregate MSDU (A-MSDU), or the number of MAC protocol data unit (MPDU) subframes included in an aggregate MPDU (A-MPDU).

5. The method of claim 1, wherein said result is determined according to a ratio of a total number of retry times at a plurality of transmission rates to a total number of data packets transmitted at said plurality of transmission rates.

6. The method of claim 1, wherein said result is determined according to the distribution of retries with respect to transmission rates.

* * * * *